United States Patent
Leitner et al.

(10) Patent No.: US 11,968,755 B2
(45) Date of Patent: Apr. 23, 2024

(54) METHOD AND APPARATUSES FOR REGULATING THE OUTPUT VOLTAGE OF A VOLTAGE REGULATOR

(71) Applicant: Elmos Semiconductor SE, Dortmund (DE)

(72) Inventors: Carsten Leitner, Berlin (DE); Andre' Krieger, Berlin (DE); Christian Schmitz, Castrop-Rauxel (DE); Thomas Geistert, Warstein (DE)

(73) Assignee: Elmos Semiconductor SE, Dortmund (DE)

( * ) Notice: Subject to any disclaimer, the term of this patent is extended or adjusted under 35 U.S.C. 154(b) by 283 days.

(21) Appl. No.: 17/605,613

(22) PCT Filed: May 20, 2020

(86) PCT No.: PCT/DE2020/100437
§ 371 (c)(1),
(2) Date: Oct. 22, 2021

(87) PCT Pub. No.: WO2020/233751
PCT Pub. Date: Nov. 26, 2020

(65) Prior Publication Data
US 2022/0210889 A1 Jun. 30, 2022

(30) Foreign Application Priority Data
May 23, 2019 (DE) .................... 10 2019 113 858.2

(51) Int. Cl.
*H05B 45/10* (2020.01)
*G05F 1/10* (2006.01)
(Continued)

(52) U.S. Cl.
CPC .............. *H05B 45/00* (2020.01); *G05F 1/10* (2013.01); *H05B 45/347* (2020.01);
(Continued)

(58) Field of Classification Search
CPC ........ H05B 45/00; H05B 45/10; H05B 45/14; H05B 45/30; H05B 45/34; H05B 45/345;
(Continued)

(56) References Cited

U.S. PATENT DOCUMENTS 7,157,866 B2   1/2007  Komiya et al.
8,319,449 B2  11/2012  Hoogzaad et al.
(Continued)

FOREIGN PATENT DOCUMENTS

CN   101017646 A   8/2007
CN   106612575 A   5/2017
(Continued)

OTHER PUBLICATIONS

International Search Report dated Aug. 6, 2020 re PCT/DE2020/100437 (5 pages).

*Primary Examiner* — Long Nguyen
(74) *Attorney, Agent, or Firm* — Mindful IP Law PLLC; Michael J. McCandlish

(57) ABSTRACT

A method supplies a lighting device with electrical energy, wherein the lighting device includes at least two integrated circuits with at least one LED group by a current source associated with this LED group. The method includes generating a supply voltage by a voltage regulator, adjusting a LED group current passing the LED groups by one of the respective current sources, detecting the voltage drops across the current sources, selecting one voltage drop of each integrated circuit as a characteristic voltage drop, generating a control value of the respective integrated circuit, according to the characteristic voltage drop, reducing the control voltage when the control voltage is greater than a control value of the respective integrated circuit, and controlling the output voltage in accordance with the control (Continued)

voltage and/or in accordance with a control bus voltage derived from the control voltage.

2 Claims, 2 Drawing Sheets

(51) Int. Cl.
*H05B 45/00* (2022.01)
*H05B 45/347* (2020.01)
*H05B 45/3725* (2020.01)
*H05B 45/395* (2020.01)
*H05B 45/46* (2020.01)

(52) U.S. Cl.
CPC ....... *H05B 45/3725* (2020.01); *H05B 45/395* (2020.01); *H05B 45/46* (2020.01)

(58) Field of Classification Search
CPC .. H05B 45/347; H05B 45/37; H05B 45/3725; H05B 45/395; H05B 45/40; H05B 45/44; H05B 45/46; G05F 1/10; G05F 1/46
See application file for complete search history.

(56) References Cited

U.S. PATENT DOCUMENTS

| | | | |
|---|---|---|---|
| 8,519,632 B2 | 8/2013 | Krespach et al. | |
| 9,974,129 B1 | 5/2018 | Kiong | |
| 11,751,307 B2 * | 9/2023 | Leitner | H05B 45/347 315/297 |
| 2007/0139317 A1 | 6/2007 | Martel et al. | |
| 2008/0122383 A1 | 5/2008 | Katoh | |
| 2009/0230874 A1 | 9/2009 | Zhao et al. | |
| 2010/0026209 A1 | 2/2010 | Liu | |
| 2010/0201278 A1 | 8/2010 | Zhao | |
| 2011/0012521 A1 | 1/2011 | Byun et al. | |
| 2011/0043114 A1 | 2/2011 | Hsu et al. | |
| 2011/0248648 A1 * | 10/2011 | Liu | H05B 45/14 315/246 |
| 2012/0056865 A1 | 3/2012 | Shih et al. | |
| 2012/0268012 A1 | 10/2012 | Walker | |
| 2014/0070727 A1 | 3/2014 | Pflaum | |
| 2014/0292220 A1 | 10/2014 | Trattler | |
| 2022/0210886 A1 * | 6/2022 | Leitner | H05B 45/46 |

FOREIGN PATENT DOCUMENTS

| | | |
|---|---|---|
| CN | 109392218 A | 2/2019 |
| DE | 10318780 A1 | 12/2004 |
| DE | 102006055312 A1 | 8/2007 |
| DE | 102007004877 A1 | 8/2008 |
| DE | 102005028403 B4 | 11/2013 |
| DE | 102017116647 A1 | 1/2019 |
| EP | 1499165 B1 | 1/2005 |
| EP | 2293165 A1 | 3/2011 |
| EP | 2600695 B1 | 6/2013 |
| EP | 3344013 A1 | 7/2018 |
| WO | 2013030047 A1 | 3/2013 |

* cited by examiner

METHOD AND APPARATUSES FOR REGULATING THE OUTPUT VOLTAGE OF A VOLTAGE REGULATOR

CROSS-REFERENCE TO RELATED APPLICATIONS

This application is a national stage of, and claims priority to, Patent Cooperation Treaty Application No. PCT/EP2020/100437, filed on May 20, 2020, which application claims the priority of German Patent Application 10 2019 113 858.2 of May 23, 2019, the contents of which are incorporated into the subject matter of the present application by reference.

BACKGROUND

LED lighting is increasingly being used in the automotive industry. The problem here is that the light-emitting diodes do not all have the same threshold voltage, but the LEDs are all supplied with electrical energy from a voltage source. The luminosity of the LEDs is typically set via respective power sources. These power sources drop electrical power that must be minimized. The voltage source is preferably an energetically favorable switching converter, which accordingly generates little waste heat. The problem now arises as to how several integrated circuits, each of which typically have several LED current sources, can efficiently and easily regulate such an upstream voltage source.

For example, the following documents from the technical field of the disclosure are known from the prior art:

A drive device for a colored background light is known from DE 10 2006 055 312 A1. Each LED string is connected with one voltage source and one current source in a complex way to circumvent the problem of the combined control.

DE 10 318 780 A1 discloses a control circuit for generating two or more regulated or controlled constant currents through one consumer each, e.g. a LED, with a common in the size adjustable supply voltage supplying the individual constant current sources. The technical teaching of DE 10 318 780 A1 is characterized in that the size of the supply voltage is adjusted to the constant current source which generally or at the respective point in time feeds the greatest total impedance and thus requires the greatest supply voltage. The amount of the supply voltage is set so minimally that the amount of the voltage occurring across one of the power sources is just sufficient for its operation. The regulation of several LED branches is done by a Diode selection control, which selects a minimum voltage of a power source.

An electronic device for controlling a light-emitting semiconductor device is known from U.S. Pat. No. 8,319,449 B2. The device of U.S. Pat. No. 8,319,449 B2 comprises
  a feedback input configured and arranged to receive a detection value,
  an output port that is configured and arranged to supply the light emitting device responsive to a current source and
  a control circuit electrically decoupled or isolated from the light emitting semiconductor device.

The control circuit is configured and arranged in such a way that, in response to the detection value received from the controller, it controls a switched-mode power supply via the output port in order to supply the semiconductor light-emitting device. The controller of the switched-mode power supply is supplied via the feedback input, which indicates a voltage across the current source in order to determine a current through the light-emitting semiconductor device. The switched-mode power supply is controlled in such a way that the voltage across the current source is kept at the minimum level necessary for device operation. A Circuit selects the minimum current source voltage as the control voltage for the voltage source.

An LED driver circuit for controlling an LED light source is known from US 2010/026209 A1. The LED driver circuit of US 2010/0 026 209 A1 comprises a regulator which is coupled to the LED light source in order to supply it with an output voltage, a current source which is coupled to the LED light source in order to adjust its drive current; and a controller coupled to the current source and the regulator for sensing a voltage of the current source to generate a control signal for the regulator to regulate the output voltage. The technical teaching of US 2010/0 026 209 A1 does not solve the problem of how several controllers can be coupled with one another with little effort.

A drive device for a light-emitting element is known from U.S. Pat. No. 7,157,866 B2. According to the technical teaching of U.S. Pat. No. 7,157,866 B2, this includes a booster circuit for increasing a given power supply voltage in order to generate a required booster voltage at an output end of the booster circuit, a voltage switching circuit for selectively outputting the power supply voltage or step-up voltage at one switching voltage output end of the voltage switching circuit, a first driver connected in series with a first light emitting element group and connected between the switched voltage output end and a reference voltage node, the first driver being controlled by a first command signal, and a second driver connected in series with a second light emitting element group resulting in a larger voltage drop than the first group, and connected between the output end of the step-up voltage output and the reference voltage node, the second driver being controlled by a second command signal. The technical teaching of U.S. Pat. No. 7,157,866 B2 does not solve the problem of how several controllers can be coupled to one another with little effort.

EP 1 499 165 B1 discloses a load driver device for driving multiple loads, each of which is connected in series with an associated constant current source, wherein the load drive device comprises a power supply circuit providing an output voltage for the multiple loads that can be achieved by converting an input voltage into the output voltage. The technical teaching of EP 1 499 165 B1 is characterized in that the constant current sources are of an adjustable type, and each of the constant current sources is able to supply an adjustable constant output current for the corresponding load; and further in that the output voltage is controlled to hold constant a lowest one of the voltages at the common node between each of the multiple loads and its respective constant current source. The technical solution of the EP 1 499 165 B1 is similar to one of the solutions described above. The technical teaching of EP 1 499 165 B1 also does not solve the problem of how several controllers can be coupled to one another with little effort. The voltage signals make the solution very susceptible to EMC signals and potential misalignments.

A control device for at least one series connection of several light-emitting diodes is known from U.S. Pat. No. 8,519,632 B2. A control device according to the technical teaching of U.S. Pat. No. 8,519,632 B2 comprises a voltage regulating unit able to regulate the operating voltage for the at least one series connection of the light-emitting diodes, and a current control unit for each of the at least one series connection of light-emitting diodes, wherein the current control unit is set up to regulate the current through the specific series connection of light-emitting diodes, and wherein the current control unit is connected to the voltage control unit to transmit a current control signal to the voltage control unit. The voltage regulating unit contains a voltage divider, wherein the voltage divider is connected between an operating voltage of the at least one series connection of light-emitting diodes and ground, wherein the operating voltage is provided by the voltage regulating unit. A tap of the voltage divider and an input of a first control stage are connected to an output of a second control stage, so that if the current control signal exceeds a predetermined voltage, a voltage at the tap of the voltage divider is reduced. The technical teaching of U.S. Pat. No. 8,519,632 B2 also uses voltage signals that are selected by diodes (reference numbers 51, 52, 53 of U.S. Pat. No. 8,519,632 B2). The voltage signals make the solution very susceptible to EMC signals and potential misalignments.

A current source arrangement is known from DE 10 2005 028 403 B4, in which the voltage regulator uses a voltage signal to signal the voltage dropping below a minimum voltage drop in one of the power sources for supplying an LED string is communicated. The voltage signals make the solution very susceptible to EMC signals and potential misalignment.

A solution is known from WO 2013/030 047 A1 in which, for each current source, a voltage signal corresponding to the voltage drop across this current source is transmitted analogously to a central unit and there transmitted in a voltage control signal for controlling a common power supply. The voltage signals make the solution very susceptible to EMC signals and potential misalignments.

US 2008/0 122 383 A1 discloses an LED driver for feeding electrical current into an LED circuit, which consists either of a single LED or a plurality of LEDs that are connected to one another in series, wherein the LED Driver sets a constant current circuit part that is serially connected to the LED circuit and a current to a predetermined value flowing from an upstream to a downstream side thereof, a voltage setting part that is serially connected to the constant current circuit part, wherein the voltage setting part adjusts a potential difference between the upstream and downstream sides with a switching regulator. The technical teaching of US 2008/0 122 383 A1 also does not solve the problem of how several controllers can be coupled with one another with little effort.

Also from US 2011/0 043 114 A1, US 2007/0 139 317 A1, US 2009/0 230 874 A1, US 2012/0 268 012 A1, EP 2 600 695 B1 and US 2011/0 012 521 A1 solutions are known in which, for each current source, a voltage signal is transmitted analogously to a central unit corresponding to the voltage drop across this current source. There, the voltage signal is transmitted in a voltage control signal for controlling a common voltage supply. The voltage signals make the solution very susceptible to EMC signals and potential misalignments.

A solution is known from US 2010/0201278 A1 in which the controllers are connected in a loop. Each controller determines the voltage values of the voltage drops across its LED power sources and compares the minimum value of these voltage values with a voltage value at a voltage value input. If the own minimum voltage value is less than this voltage value at the voltage value input, the respective controller sends its minimum voltage value to the voltage value input of the following controller. If the own minimum voltage value is greater than this voltage value at the voltage value input, the respective controller sends this voltage value at the voltage value input to the voltage value input of the downstream controller. The voltage signals make the solution very susceptible to EMC signals and potential misalignments.

US 2011/0 012 521 A1 requires the reference values to be transmitted over a plurality of lines (reference symbols Vf1~Vfi, Vfi+1~Vf2i, Vf2i+1~Vf3i in FIG. 1 of US 2011/0 012 521 A1). This results in a considerable amount of wiring and a considerable number of rules. The evaluation is carried out in the technical teaching of US 2011/0 012 521 A1 by a Microcomputer, which results in the need for an analog-to-digital converter and a PWM unit for digital-to-analog conversion.

US 2010/0201278 A1 discloses a method and a device for regulating an output voltage. In the technical teaching of US 2010/0201278 A1, each LED driver determines a minimum voltage value for the voltage drops across its LED power sources, compares this voltage drop value with its predecessor in a chain and transmits the minimum voltage value of these two voltage values to its successor. In the event of a driver failure, the control system will fail completely.

SUMMARY

The proposal is therefore based on the object of creating a solution which does not have the above disadvantages of the prior art and has further advantages.

This object is achieved by a method and a device according to the independent claims.

Disclosed are a method and associated devices for regulating the output voltage ($V_o$) at the output ($V_{out}$) of a voltage regulator (VREG) for supplying a lighting device with several, but at least two integrated circuits (IC1, IC2) each with at least one LED Group ($LED_{1a,LE}$, $LED_2$) each with an associated LED power source, a LED driver (LED DRV), each circuit (IC1, IC2) with electrical energy. In contrast to the prior art, the common feedback signal from the Feedback signals from the circuits (IC1, IC2) are not generated via diodes, but via voltage-controlled current sources.

An example method includes generating a supply voltage ($V_o$) by means of the voltage regulator (VREG) as a first step, adjusting of a LED group current ($I_{LED1a}$, $I_{LED1b}$, $ILED_2$) passing the LED groups ($LED_{1a}$, $LED_{1b}$, $LED_2$) by means of one of these respectively current sources (LED DRV) as a second step, detecting the voltage drops across said current sources (LED DRV) as a respective voltage drop value as a third step, selecting one voltage drop value of each integrated circuit (IC1, IC2) as a characteristic voltage drop value of said integrated circuit (IC1, IC2) as a fourth step, generating of a control value signal at a node (K1, K2) of said respective integrated circuit (IC1, IC2), according said characteristic voltage drop value as a fifth step, reducing the magnitude of a control voltage ($V_R$) when the magnitude of the control voltage ($V_R$) is greater than the magnitude of the control value signal at the node (K1, K2) of said respective integrated circuit (IC1, IC2) as a sixth step, and controlling the output voltage ($V_o$) in accordance with the control voltage ($V_R$) and/or in accordance with a control bus voltage ($V_{RB}$) derived from the control voltage ($V_R$) as a last step.

The disclosure is explained with reference to FIG. 1 as an example. The claims are decisive for the claimed technical teaching. In the example of FIG. 1, only two integrated circuits (IC1, IC2) are drawn in for better clarity. For the sake of clarity, however, the description is carried out for n integrated circuits (IC1, IC2 to ICn), where n is an integer greater than 1.

The voltage regulation is preferably carried out as shown in FIG. 1. Disclosed is a voltage-controlled voltage regulator, which disintegrates into an actual voltage-controlled Voltage regulator (VREG), as it is widely known from patent literature, and surrounding circuitry (R1, R2, VC-C, R4).

The proposed device comprises several, preferably n, but at least two, integrated circuits (IC1, IC2 to ICn). In the following, these n integrated circuits (IC1, IC2, to ICn) are also referred as "ICs".

Below, the proposed control loop for regulating the voltage regulator (VREG) will be described.

The voltage regulator (VREG) is trimmed by an additional current ($I_{ADJ}$) in its feedback path (R1, R2) by means of the voltage control signal (VCTR). A linear regulator is assumed here as a voltage regulator (VREG) which, according to an internal reference of the voltage regulator (VREG), transfers the voltage to its voltage regulator output ($V_{out}$) readjusted via the first resistor (R1). According to the disclosure, however, other regulators can also be used at this point.

The amount of this additional current ($I_{ADJ}$) is determined by the voltage of a common control bus (RB) of the participating n integrated circuits (IC1, IC2, to ICn) with respect to the reference potential (GND) with the help of a voltage-to-current converter (VC-C). In the example shown in FIG. 1 the voltage-to-current converter (VC-C) comprises the zeroth differential amplifier (OP0), the third resistor (R3) and the zeroth transistor (TO). In the example in FIG. 1, a reduction in the control bus voltage ($V_{RB}$) leads to an increase in the LED supply voltage in the form of a voltage increase at the voltage regulator output ($V_{OUT}$). Other constructions with a different behavior, but based on the same construction principle, are conceivable.

All integrated circuits (IC1, IC2, to ICn) connected to the control bus (RB) set the control bus voltage ($V_{RB}$) on this control bus (RB), wherein the lowest voltage generated by an integrated circuit (IC1, IC2, to ICn) to the control bus (RB) is actually set. However, this is not achieved by a diode connection, as is known from the prior art, but by interconnecting several voltage-controlled current sources of the transistors (T1, T2 to Tn) of these current sources.

This is ensured in the first integrated circuit (IC1) by the open drain driver consisting of the first differential amplifier (OP1) and the first transistor (T1). The first differential amplifier (OP1) provides a first reference voltage for the first transistor (T1). The first transistor (T1) thereby works as a first current source.

In the second integrated circuit (IC2) this is ensured by the open-drain driver consisting of a second differential amplifier (OP2) and a second transistor (T2). The second differential amplifier (OP2) provides a second reference voltage for the second transistor (T2). The second transistor (T2) thus works as a second current source.

In the optional third integrated circuit (IC3), not shown, this is ensured by the open-drain driver comprising the third differential amplifier (OP3) and the third transistor (T3). The third differential amplifier (OP3) provides a third reference voltage for the third transistor (T3) The third transistor (T3) thus works as a third current source. The third integrated circuit (IC3), not shown, is assumed here, if present, as of an analogous structure to the second integrated circuit (IC2) with regard to the device parts of the second integrated circuit (IC2) discussed here.

In the optional fourth integrated circuit (IC4), not shown, this is ensured by the open-drain driver comprising a fourth differential amplifier (OP4) and a fourth transistor (T4). The fourth differential amplifier (OP4) provides a fourth reference voltage for the fourth transistor (T4). The fourth transistor (T4) thus works as a fourth current source. The fourth integrated circuit (IC4), not shown, is assumed here, if present, as a structure analogous to the second integrated circuit (IC2) with regard to the device parts of the second integrated circuit (IC2) discussed here.

This is optionally continued up to the optionally present n-th integrated circuit (ICn).

In this optional n-th integrated circuit (ICn), which is not shown, this is ensured by the open-drain driver comprising the n-th differential amplifier (OPn) and the n-th transistor (Tn). The n-th differential amplifier (OPn) provides an n-th reference voltage for the n-th transistor (Tn). The n-th transistor (Tn) thereby works as an n-th current source. The n-th integrated circuit (ICn), not shown, is assumed here, if present, to be constructed as an example analogous to the second integrated circuit (IC2) with regard to the device parts of the second integrated circuit (IC2) discussed here.

If the system has more than two integrated circuits (IC1, IC2), this is set accordingly for the possibly existing further integrated circuits (IC3 to ICn), i.e. a possible third integrated circuit (IC3) not shown, not shown fourth integrated circuit (IC4) up to a possible, not shown n-th integrated circuit (ICn), where n is a positive integer greater than 1. As already mentioned, the designations IC3, IC4 and ICn are to be understood as corresponding to the reference symbols IC1 and IC2. These names are listed here for clarity. These designations are therefore not reference symbols, since they cannot be found in the drawings, since the drawings have not been burdened with unnecessary complexity for the sake of clarity. It is clear to the person skilled in the art that the control bus (RB) can be expanded to n integrated circuits (IC1 to ICn). In each of these integrated circuits (IC1, IC2 to ICn) the voltage is detected via a respective regulator (RA) at the respective transistor node (K1, K2 to Kn) and readjusted via the respective associated differential amplifier (OP1, OP2 to OPn) of the respective integrated circuit (IC1 to ICn).

Since each IC of the ICs (IC1 to ICn) can only derive a current from the control bus (RB) to the reference potential (GND), it is necessary that an electrical current ($I_{bias}$) is supplied to the control bus (RB) via a respective constant current source (IQ) of the respective integrated circuit (IC1 to ICn) or corresponding resistors connected to the control bus (not shown here). The feed line via said constant current sources (IQ) of the respective integrated circuits (IC1, IC2 to ICn) is preferred.

Each integrated circuit typically includes an analog-to-digital converter (ADC). Especially, each of the integrated circuits (IC1, IC2, to ICn) measures the working voltages of their active LED channels and/or the voltage drop values of the voltage drops across the power source supplies of the LED groups($LED_1$ to $LED_n$) working LED driver (LED-DRV) of this integrated circuit of the integrated circuits (IC1, IC2 to ICn) by means of its analog-to-digital converter (ADC). When LED groups are mentioned in this disclosure, these can be the interconnection of several LEDs. For example, an LED group (e.g. $LED_1$) can consist of a parallel connection of two LED groups ($LED_{1b}$, $LED_{1b}$). Possibly, ends of these LED groups connected in parallel can be driven by different LED drivers (LED-DRV). LED groups (LED) can also be a series connection of several LED groups ($LED_{2a}$, $LED_{2b}$). An LED group in the sense of this disclosure comprises at least one LED. LED is an abbreviation for light-emitting diode.

In the device according to the disclosure, in each case there is provided a power source in the form of an LED driver (LED DRV) for each LED group ($LED_{1a}$, $LED_{1b}$, $LED_2$).

For example, this integrated circuit of the integrated circuits (IC1, IC2 to ICn) or a part of it determines from the determined voltage drop values a minimum voltage drop value or another characteristic value. The characteristic value can also be, for example, to name an alternative, the second smallest voltage drop value minus a suitable lead. One such method for determining the characteristic value has the advantage that an open current control connection does not prevent regulation and prevents overvoltage. By determining the deviation of this characteristic value from a nominal value by means of a controller (RA) and the said current source in the form of its associated transistor (T1 to Tn), the integrated circuit determines the potential output voltage for this integrated circuit at its control bus output to the control bus (RB). If the potential of the control bus (RB) against the reference potential (GND), i.e., the control voltage ($V_R$) at the fourth resistor (R4), is too small, the integrated circuit reduces the current through its transistor (T1 to Tn) to conduct more current from the constant current sources (IQ) of the integrated circuit through the fourth resistor (R4) and thus increasing the control voltage at the fourth resistor (R4). However, this is not possible if simultaneously the potential of the control bus (RB) with respect to the reference potential (GND) in another integrated circuit, i.e., the control voltage ($V_R$) at the fourth resistor (R4), is correct or too high. In that case, namely, the transistor (T1 to Tn) of the other integrated circuit takes up the additional current made available by the constant current source (IQ) of the integrated circuit, which means that no more current from the constant current sources (IQ) of the integrated circuit passes through the fourth resistance (R4) is directed. In this case, the control voltage at the fourth resistor (R4) is not increased. Thus, the integrated circuit with the lowest characteristic value determines the control voltage ($V_R$) on the fourth resistance (R4). One advantage is that this interaction takes place via the current.

The working voltages of their active LED channels, i.e., the voltage drops over the LED driver of the respective integrated circuit, are always measured by the analog-to-digital converter (ADC) of the integrated circuit (IC1, IC2, ... ICn) at a point of time, in which the respective LED channel of the integrated circuit (IC1, IC2, ... ICn) drives a current. This is especially the case in the on-phase of the PWM control of the respective LED channels. If an LED group is supplied with electrical current by the LED driver (LED-DRV) of an integrated circuit, this is an active LED group. This is an active LED channel for the respective integrated circuit.

The controller (RA) selects a reference channel from the active LED channels, the current voltage of which is used as the input variable for the control circuit. As already mentioned, the lowest voltage value is not necessarily chosen as a reference. Rather, a low value evaluated by means of filtering and error consideration is used to select the reference channel. A hysteresis ensures that interference and noise in the measurement results do not lead to an offset in the control voltage.

The following also applies:

Integrated circuits in which no LED channel is active (i.e., permanently switched off) switch their output to the control bus (RB) to high resistance, for example via a respective switch (SW). As a result, they do not take part in the regulation of the output voltage ($V_O$) of the voltage regulator (VREG) at its voltage regulator output ($V_{out}$) against the reference potential (GND). If none of the integrated circuits on the control bus (RB) drives the control bus (RB) (all switches (SW) of all circuits (IC1 to ICn) are high-resistance,) the fourth resistor (R4) ensures that the control voltage ($V_R$) at the fourth resistor (R4) and thus the control bus voltage ($V_{RB}$) is minimal and thus the maximum supply voltage is available at the voltage regulator output ($V_{OUT}$) as soon as a driver (LED-DRV) of the integrated circuit (IC1 to ICn) is activated again to supply one of the LED groups ($LED_1$, $LED_2$ to $LED_n$) with electrical energy. The size of the fourth resistor (R4) must be chosen so that the necessary maximum voltage of the control voltage ($V_R$) at the fourth resistor (R4) and thus the control bus voltage ($V_{RB}$) can be achieved by the constant current ($I_{bias}$) of the constant current source (IQ) only of a driving integrated circuit (IC1, IC2, ... ).

Optionally, for example, a filter can be realized with an exemplary filter resistor (Rf) and an exemplary filter capacitance (CO, wherein the filter eliminates disturbances in the control voltage ($V_R$) at the fourth resistor (R4) on the control bus (RB) from the current-to-voltage converter (VC-C) and thus generates a filtered control bus voltage ($V_{RB}$).

Alternative control bus design:

Another possibility is not to output a control voltage directly to the control bus (RB), but to generate a PWM signal for the purpose of greater immunity to interference, wherein the PWM signal is converted into the control voltage for the current-to-Voltage converter (VC-C) (OPO, TO and R3) via a suitable low-pass filter (Rf, Cf). For example, the low-pass filter is implemented here using the filter resistance (Rf) and the filter capacitance (Cf). Other implementations of the low-pass filter are of course possible.

The control procedure described above is now modified for this purpose.

The voltage regulator (VREG) is trimmed by an additional current ($I_{ADJ}$) into its feedback path (R1, R2). Here again a linear regulator is assumed as a voltage regulator (VREG), which, according to an internal reference of the voltage regulator (VREG), readjusts the voltage at its voltage regulator output ($V_{out}$) via the first resistor (R1). According to the disclosure, however, as already mentioned, other controllers can also be used.

The amount of this additional current ($I_{ADJ}$) is controlled by the control voltage ($V_R$) at a fourth resistor (R4) of a common control bus (RB) of the ICs involved (IC1, IC2, to ICn) in relation to the reference potential (GND) with the help of a voltage to-current converter (VC-C). In the example shown in FIG. 1, the voltage-to-current converter (VC-C) comprises the zeroth differential amplifier (OPO), the third resistor (R3) and the zeroth transistor (TO). A reduction of the control voltage ($V_R$) at the fourth resistor (R4) and thus of the control bus voltage ($V_{RB}$) leads to an increase in the LED supply voltage in the form of a voltage increase of the output voltage ($V_O$) at the voltage regulator output (Vou T) against the reference potential (GND).

All connected integrated circuits (IC1, IC2, to ICn) now use PWM modulation to set the average control voltage ($V_R$) at the fourth resistor (R4) and thus the control bus voltage ($V_{RB}$) on this control bus (RB), wherein the lowest mean PWM-modulated voltage output by an integrated circuit (IC1, IC2 ... ) on the control bus (RB) actually being set. The integrated circuits (IC1 to ICn) are synchronized with regard to the phase position of the PWM periods of the PWM signal output on the control bus (RB). This modification is shown as an example in FIG. 2.

This is ensured in the first integrated circuit (IC1) by the open drain driver consisting of the first differential amplifier (OP1) and the first transistor (T1). Now, however, the difference between the potential of the first node (K1) and the filtered control voltage ($V_R$) at the fourth resistor (R4) is massively amplified by the first differential amplifier (OP1), so the first transistor (T1) either blocks fully or switches through fully. A filter (F) filters the voltage curve of the control voltage ($V_R$) at the fourth resistor (R4) and thus generates a signal of the mean control voltage ($V_R$) at the fourth resistor (R4), wherein the signal is compared with the reference voltage at the first node (K1) by the first differential amplifier (OP1). The filter (F) is preferably an integrating filter, for example a low-pass filter.

In the second integrated circuit (IC2) this is ensured by the open-drain driver consisting of a second differential amplifier (OP2) and a second transistor (T2). Now, however, the difference between the potential of the second node (K2) and the filtered control voltage ($V_R$) at the fourth resistor (R4) is massively amplified by the second differential amplifier, so the second transistor (T2) either blocks fully or turns on fully. A filter (F) filters the voltage curve of the control voltage ($V_R$) at the fourth resistor (R4) and thus generates a signal of the mean control voltage ($V_R$) at the fourth resistor (R4), wherein the signal is compared with the reference voltage at the second node (K2) by the second differential amplifier (OP2). The filter (F) is preferably an integrating filter, for example a low-pass filter.

In an optional third integrated circuit (IC3) this is ensured by the open drain driver consisting of a third differential amplifier (OP3) and a third transistor (T3). Now, however, the difference between the potential of the third node (K3) and the filtered control voltage ($V_R$) at the fourth resistor (R4) is massively amplified by the third differential amplifier (OP3) that the third transistor (T3) either blocks fully or fully switches on. A filter (F) filters the voltage curve of the control voltage ($V_R$) at the fourth resistor (R4) and thus generates a signal of the mean control voltage ($V_R$) at the fourth resistor (R4), wherein the signal is compared with the reference voltage at the third node (K3) by the third differential amplifier (OP3). The filter (F) is preferably an integrating filter, for example a low-pass filter.

In an optional fourth integrated circuit (IC4), this is ensured by the open-drain driver consisting of a fourth differential amplifier (OP4) and a fourth transistor (T4). Now, however, the difference between the filtered potential of the fourth node (K4) and the mean control voltage ($V_R$) at the fourth resistor (R4) is massively amplified by the fourth differential amplifier (OP4) that the fourth transistor (T4) either blocks fully or fully switches through. A filter (F) filters the voltage curve of the control voltage ($V_R$) at the fourth resistor (R4) and thus generates a signal of the mean control voltage ($V_R$) at the fourth resistor (R4), wherein the signal is compared with the reference voltage at the fourth Node (K4) by the fourth differential amplifier (OP4). The filter (F) is preferably an integrating filter, for example a low-pass filter.

This continues for further optional integrated circuits up to an optional n-th integrated circuit (ICn).

In the optional n-th integrated circuit (ICn), this is ensured by the open-drain driver consisting of an n-th differential amplifier (OPn) and an n-th transistor (Tn). Now, however, the difference between the potential of the n-th node (Kn) and the filtered control voltage ($V_R$) at the fourth resistor (R4) is massively amplified by the n-th differential amplifier (OPn), so the n-th transistor (Tn) either fully blocks or fully switches. A filter (F) filters the voltage curve of the control voltage ($V_R$) at the fourth resistor (R4) and thus generates a signal of the mean control voltage ($V_R$) at the fourth resistor (R4), wherein the signal is compared with the reference voltage at the n-th node (Kn) by the n-th differential amplifier (OPn). The filter (F) is preferably an integrating filter, for example a low-pass filter.

In each IC (IC1 to ICn) the voltage at the respective node (K1, K2, to Kn) is detected via a regulator (RA) and readjusted via the respective associated differential amplifier (OP1, OP2, to OPn) by changing the mean value of the PWM-modulated control voltage ($V_R$) at the fourth resistor (R4).

Since each IC (IC1 to ICn) can only derive a current from the control bus (RB) against the reference potential (GND) by means of its transistors (T1 to Tn), it is necessary again that an electric current ($I_{bias}$) is supplied to the control bus (RA) via a respective constant current source (IQ) or accordingly connected resistors (not shown here).

The connected integrated circuits (IC1, IC2, to ICn) output their control bus output voltage as a PWM-modulated signal. The PWM-modulated signal has a duty cycle (duty_cycle$_{PWM}$). According to Wikipedia the duty cycle for a periodic sequence of pulses according to standardization specifies the ratio of the pulse duration to the period duration. The duty cycle is specified as a ratio of the number dimension with a range of values from 0 to 1 or 0% to 100%. The PWM-modulated signal also has an upper logic voltage $V_{HIGH}$ and a lower logic voltage $V_{LOW}$. The resulting mean voltage value $V_{mean}$ is calculated as $V_{mean}$=duty_cycle$_{PWM}$* ($V_{HIGH}$-$V_{Low}$). The resulting mean voltage value equals the analog output voltage determined by the regulator (RA) of the respective integrated Circuit (IC1 to ICn). The frequencies of the PWM signals output by the integrated circuits (IC1 to ICn) must be approximately the same for all connected integrated circuits (IC1 to ICn). It should also apply to all integrated circuits (IC1 to ICn) that the voltages $V_{HIGH}$ and $V_{LOW}$ of the integrated circuits (IC1, IC2, to ICn) output by the respective open drain drivers (OP1 & T1, OP2 & T2 to OPn & Tn) are approximately the same.

In another variant, all connected integrated circuits (IC1, IC2, ... ) set the control bus voltage ($V_{RB}$) on this control bus (RB) by generating a common PWM signal whose average voltage is passed through a low-pass filter (Rf and Cf) and connects to the voltage-to-current converter (VC-C). For this purpose, an integrated circuit of the integrated circuits (IC1 to ICn), whose output PWM has a duty cycle less than 100% begins to drive its output to the lower logic voltage $V_{LOW}$. Accordingly, the control bus voltage ($V_{RB}$) on the control bus (RB) follows this falling edge and there is an equally falling voltage edge of the control voltage ($V_R$) on the fourth resistor (R4), wherein the voltage edge has to be detected by all other integrated circuits (IC1, IC2, to ICn) on the control bus (RB) in order to align the phase of their own PWM modulation of the control of their respective transistor (Ti to Tn). This synchronizes the various PWM signals of the various integrated circuits (IC1, IC2, to ICn) with one another. The integrated circuit, whose output signal on the control bus (RB) has the lowest duty cycle determines the resulting duty cycle (duty_cycle$_{PWM}$) of the control voltage ($V_R$) at the fourth resistor (R4) of the control bus (RB), since its transistor pulls the control voltage ($V_R$) at the fourth resistor (R4) the furthest to the lower voltage potential $V_{LOW}$.

Each integrated circuit of the integrated circuits (IC1 to ICn) has an analog-to-digital converter (ADC). Each integrated circuit of the integrated circuits (IC1, IC2 to ICn) uses its analog-to-digital converter (ADC) to measure the working voltages of its active LED channels and/or the voltage drop across its active LED drivers (LED-DRV) and determines the output voltage at its control bus output to the control bus (RB) by means of the deviation from a target value via a regulator (RA). The working voltages of its active LED channels and/or the voltage drop across its active LED drivers (LED-DRV) are always measured at a time by the analog-to-digital converter (ADC) of the integrated circuit (IC1, IC2, to ICn), at which the respective LED channel of the integrated circuit (IC1, IC2, to ICn) or the associated LED driver (LED-DRV) drives a current. This is particularly the case in the on-phase of the PWM control of the respective LED channels.

The controller (RA) selects a reference channel from the actively switched LED channels, wherein the current voltage and/or the voltage drop across the relevant active LED driver (LED-DRV) of the reference channel is used as an input variable for the control loop. The smallest voltage value of these variables is not necessarily chosen as a reference. Rather, a low value evaluated by means of filtering and error consideration is used to select the reference channel. A hysteresis ensures that interference and noise in the measurement results do not lead to an offset in the control voltage.

The following also applies:

Integrated circuits in which no LED channel or LED driver (LED-DRV) is active (i.e., permanently switched off) switch their output to the control bus (RB) to high resistance, for example via the respective switch (SW). If none of the integrated circuits on the control bus (RB) drives the control bus (RB), i.e., all switches (SW) are to high-resistance, then the fourth resistor (R4) ensures that the control bus voltage ($V_{RB}$) becomes minimal and thus the maximum supply voltage at the voltage regulator output ($V_{OUT}$) is available as soon as a driver is activated again. The size of the fourth resistor (R4) must be selected such that the necessary maximum voltage of the control bus voltage ($V_{RB}$) can only be achieved with the constant current ($I_{bias}$) with a driving integrated circuit (IC1, IC2, to ICn).

Optionally, for example, with an exemplary filter resistance (Rf) and an exemplary filter capacitance (Cf), a filter can be implemented which keeps interference on the control bus (RB) away from the current-to-voltage converter (CVC-C).

A filter (F) as described above can be used here as well.

The disclosure relates to a method for regulating the output voltage ($V_O$) at the output ($V_{out}$) of a voltage regulator (VREG) for supplying a lighting device with several, but at least two, circuits (IC1, IC2) each with at least one LED group ($LED_1$, $LED_2$), wherein each LED group can consist of an interconnection of several LEDs ($LED_{1a}$, $LED_{1b}$, $LED_{2a}$, $LED_{2b}$). The interconnections can be individual LEDs, series and parallel connections of LEDs and their combinations. The respective LED group is supplied with electrical energy via the respective associated power source (LED DRV) for each circuit (IC1, IC2). A first step of the method concerns the generation of a supply voltage ($V_O$) by means of the voltage regulator (VREG) at the output ($V_{out}$) of this voltage regulator (VREG). The method further comprises setting an LED group current ($I_{LED1a}$, $I_{LED1b}$, $I_{LED2}$) through the LED groups ($LED_{1a}$, $LED_{1b}$, $LED_2$) by means of a power source (LED DRV) per LED group ($I_{LED1}a$, $I_{LED1b}$, $I_{LED2}$), as well as the detection of the respective voltage drop across the respective current source (LED DRV) of the LED groups ($I_{LED1a}$, $I_{LED1b}$, $I_{LED2}$) as the respective voltage drop value of this current source (LED DRV). This is followed by the selection of a respective voltage drop value of a current source (LED DRV) of each circuit (IC1, IC2) from the voltage drop values of the current sources (LED DRV) of this respective circuit (IC1, IC2) as the characteristic voltage drop value of this circuit (IC1, IC2) and the generation of a control value signal at the corresponding node (K1, K2) in accordance with this respective characteristic voltage drop value of the respective integrated circuit (IC1, IC2). To signal to the voltage regulator (VREG), the amount of the control voltage ($V_R$) is reduced at the fourth resistor (R4), and thus the control bus voltage ($V_{RB}$), if the amount of the characteristic voltage drop value is greater than the amount of the control value signal at the respective nodes (K1, K2) of the respective integrated circuit (IC1, IC2). Finally, the output voltage ($V_O$) of the voltage regulator (VREG) is regulated at its output ($V_{out}$) depending on the control bus voltage ($V_{RB}$). The control bus voltage ($V_{RB}$) is converted into an additional current ($I_{ADJ}$) by the voltage-to-current converter (VC-C), wherein the additional current ($I_{ADJ}$) shifts the voltage value ($V_{ADJ}$) of the voltage control signal (VCTR) against a reference potential (GND) and thus readjusts the output voltage ($V_O$) at the output ($V_{out}$) of the voltage regulator (VREG).

The disclosure further relates to a device for supplying several, but at least two, LED groups ($LED_{1a}$, $LED_{1b}$, $LED_2$) with electrical energy. The device comprises a voltage regulator (VREG), at least two integrated circuits (IC1, IC2) and a control bus (RB). Each of the integrated circuits (IC1, IC2) has at least one LED connection (LED0, LED1) for at least one LED group ($LED_{1a}$, $LED_{1b}$, $LED_2$). Each of the integrated circuits (IC1, IC2) comprises at least one LED driver (LED DRV) per LED group ($LED_{1a}$, $LED_{1b}$, $LED_2$) for the energy supply of this LED group ($LED_{1a}$, $LED_{1b}$, $LED_2$) via an associated LED connection (LED0, LED1) of this LED group ($LED_{1a}$, $LED_{1b}$, $LED_2$). Each of the integrated circuits (IC1, IC2) comprises at least one measuring device, the analog-to-digital converter (ADC), for detecting the voltage differences between the potentials of LED connections (LED0, LED1) of this integrated circuit (IC1, IC2) and a reference potential (GND). Each of the integrated circuits (IC1, IC2) comprises a local controller (RA), wherein the local controller (RA) selects a characteristic voltage drop value of this respective integrated circuit (IC1, IC2) out of the voltage drop values measured by the measuring device of the integrated circuit (IC1, IC2), the analog-to-digital converter (ADC), and wherein the local controller (RA) generates a control value signal at a node (K1, K2) respective to this characteristic voltage drop value. The integrated circuit (IC1, IC2) reduces the amount of the control bus voltage ($V_{RB}$) by means of a respective transistor (T1, T2) belonging to this integrated circuit, if this amount of the control voltage ($V_R$) at the fourth resistor (R4) is greater than the amount of the control value signal at the respective node (K1, K2) of the respective integrated circuit (IC1, IC2). The output voltage ($V_O$) of the voltage regulator (VREG) depends on the control voltage ($V_R$) at the fourth resistor (R4) and thus on the control bus voltage ($V_{RB}$).

DESCRIPTION

Figure 1:
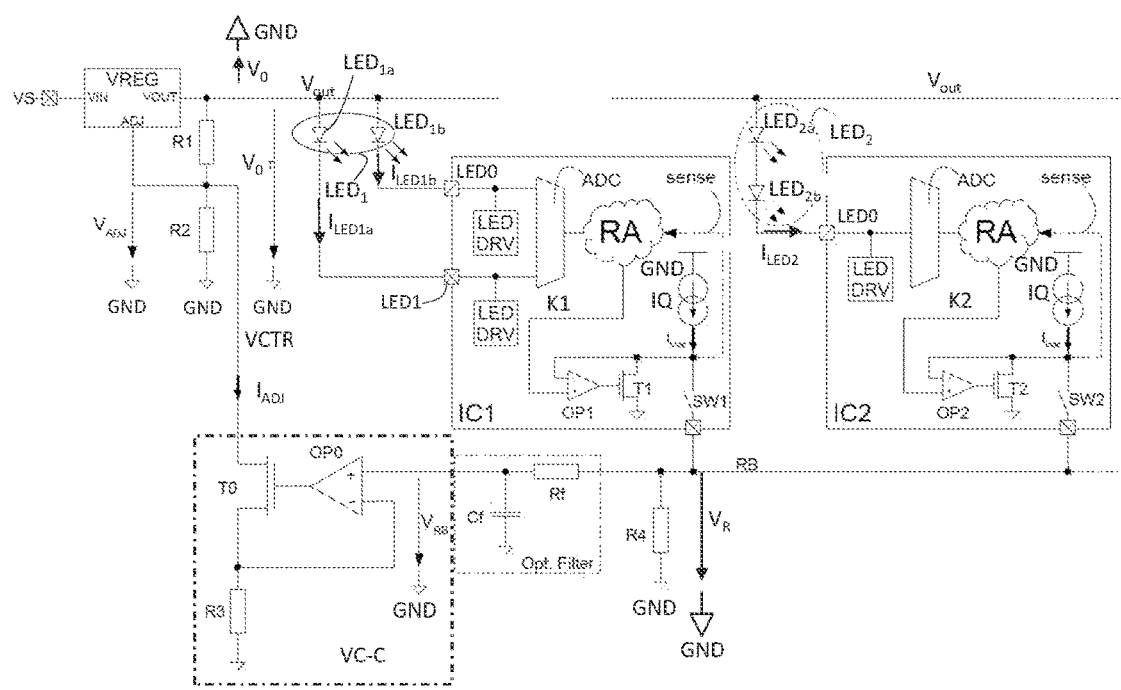
FIG. 1 shows an exemplary device for regulating a voltage regulator for supplying at least two LED groups.

FIG. 1 shows an exemplary device according to the preceding description. The device is supplied with energy via a supply voltage connection (VS) and the reference potential (GND). The voltage regulator (VREG) is connected to the supply voltage connection (VS) via its voltage input (VIN). At the voltage regulator output ($V_{out}$) the voltage regulator (VREG) supplies an output voltage ($V_O$) against the reference potential (GND). For a better overview the exemplary integrated circuit in FIG. 1 comprises only a first integrated circuit (IC1) and a second integrated circuit (IC2).

The first integrated circuit (IC1) receives electrical current out of the voltage regulator output ($V_{out}$) via a first LED driver (LED-DRV) and a first LED group ($LED_{1a}$) and via another LED driver (LED-DRV) and another first LED group ($LED_{1b}$).

The second integrated circuit (IC2) also receives electrical current from the voltage regulator output ($V_{out}$) of the voltage regulator (VREG) via a second LED driver (LED-DRV) and a second LED group ($LED_2$). As described, the LED drivers (LED-DRV) are typically power sources.

A first analog-to-digital converter (ADC) of the first integrated circuit (IC1) detects the voltage drops across the LED drivers of the first integrated circuit (IC1). A first controller (RA) of the first integrated circuit (IC1) uses these measured values measured by the first analog-to-digital converter (ADC) of the first integrated circuit (IC1) to generate a first control value signal at the first node (K1). A first differential amplifier (OP1) of the first integrated circuit (IC1) compares the potential of this first node (K1) and thus the value of the first control value signal with the potential on the control bus (RB) in the form of the control voltage ($V_R$) at the fourth resistor (R4). If the potential on the control bus (RB) in the form of the control voltage ($V_R$) at the fourth resistor (R4) is higher than the potential of the first control value signal at the first node (K1), the first differential amplifier (OP1) reduces the potential of this control bus (RB) in the form of the control voltage ($V_R$) at the fourth resistor (R4) via the first transistor (T1). In order to do so, the first differential amplifier (OP1) opens the first transistor (T1), so electrical current can pass from the control bus (RB) to the reference potential (GND). The output voltage of the first differential amplifier (OP1) can be understood as the first reference voltage of a voltage-dependent transistor current source that is formed by the first transistor (T1).

A second analog-to-digital converter (ADC) of the second integrated circuit (IC2) detects the voltage drops across the LED drivers of the second integrated circuit (IC2). Using these values measured by the analog-to-digital converter (ADC) a second regulator (RA) of the second integrated circuit (IC2) generates a second control value signal at the second node (K2). A second differential amplifier (OP2) of the second integrated circuit (IC2) compares the potential of this second node (K2), and thus the value of the second control value signal, with the potential on the control bus (RB) in the form of the control voltage ($V_R$) at the fourth resistor (R4). If the potential on the control bus (RB) in the form of the control voltage ($V_R$) at the fourth resistor (R4) is higher than the potential of the second control value signal at the second node (K2), the second differential amplifier (OP2) uses the second transistor (T2) to reduce the potential of this control bus (RB) in the form of the control voltage ($V_R$) at the fourth resistor (R4). In order to do so, the second differential amplifier (OP2) opens the second transistor (T2), so electrical current can pass from the control bus (RB) to the reference potential (GND). The output voltage of the second differential amplifier (OP2) can be used as a second reference voltage of a voltage-dependent transistor current source, which is formed by the second transistor (T2).

If the amount of the control voltage ($V_R$) at the fourth resistor (R4) is equal to or lower than the potential of the second control value signal at the second node (K2), the second differential amplifier (OP2) closes the second transistor (T2), so a larger proportion of the constant current ($I_{bias}$) of the bias current sources (IQ) of the integrated circuit (IC1, IC2) passes through the fourth resistor (R4) and thus increases the control voltage ($V_R$) across the fourth resistor (R4). However, this only works if in another circuit the amount of the control voltage (VR) at the fourth resistor (R4) is smaller than the potential of the control value signal of this other integrated circuit at its node.

In this construction, the absolute lowest control value signal, i.e., the integrated circuit of the integrated circuits (IC1, IC2) with the lowest potential at its respective node (K1 to Kn), always determines the control voltage ($V_R$) at the fourth resistor (R4) and thus the control bus voltage ($V_{RB}$)

Via the control method the individual integrated circuits (IC1, IC2) can be excluded via switches (SW1, SW2) by means of external data bus commands via a not shown communication bus, which preferably connects all integrated circuits (IC1, IC2), or the individual integrated circuits (IC1, IC2) exclude themselves via the switches (SW1, SW2) from the control method.

This is necessary if none of the LED groups ($LED_{1a}$, $LED_{1b}$, $LED_2$) of the integrated circuit in question is operated.

Constant current sources (IQ), which are each part of the integrated circuits (IC1, IC2), feed a constant current ($I_{bias}$) into the control bus (RB). The total current of the respective constant currents fed in by the integrated circuits (IC1, IC2) drops across the fourth resistor (R4) as a control voltage ($V_R$) if the total current is not derived, typically partially derived, via one or more of the transistors (T1, T2) within the integrated circuits (IC1, IC2) against the reference potential (GND).

In the example of FIG. 1, the voltage signal on the control bus (RB), i.e., the control voltage ($V_R$), is filtered to control bus voltage ($V_{RB}$) by an exemplary low pass consisting of a filter capacitance (Cf) and a Filter resistance (Rf)

A voltage-to-current converter (VC-C), consisting of a third resistor (R3), a zeroth transistor (T0) and a zeroth differential amplifier (OP0), converts the control bus voltage ($V_{RB}$) into an additional current ($I_{ADJ}$) of a voltage control signal (VCTR). This additional current ($I_{ADJ}$) passes the first resistor (R1) of the feedback voltage divider (R1, R2) of the voltage regulator (VREG) and thus warps the control input (ADJ) of the voltage regulator (VREG) in dependence of the control bus voltage ($V_{RB}$) and thus from the control voltage ($V_R$).

Figure 2:
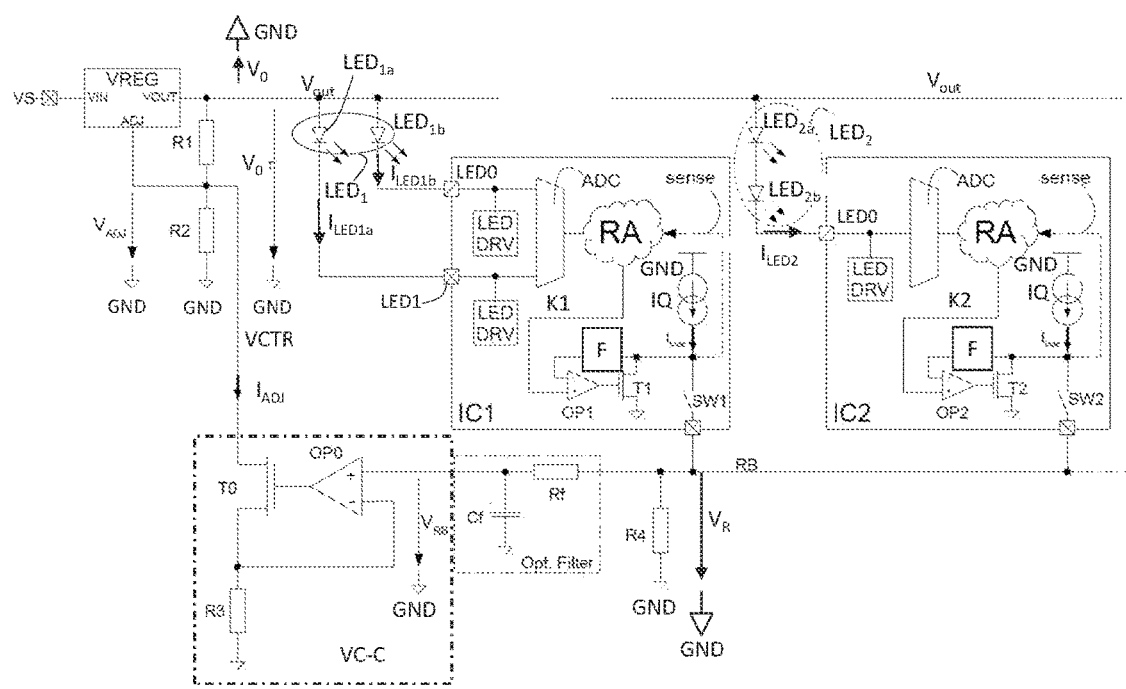
FIG. 2 shows an exemplary device for regulating a voltage regulator for supplying at least two LED groups, including a filter for PWM modulation on the control bus (RB)

FIG. 2 shows an exemplary device according to the preceding description and FIG. 1. In contrast to FIG. 1, the integrated circuits (IC1, IC2) of FIG. 2 are provided with a filter (F) in order to perform PWM modulation on the control bus (RB).

A device according the disclosure allows a regulation of the voltage regulator (VREG) in a simple manner in order to supply more complex LED arrangements supplied with electrical energy from several integrated circuits. According to the disclosure, it was recognized that this is particularly easy with a current-controlled voltage regulator. Here, the total current (I s) through the fourth resistor (R4) is the actual value signal and the input of the voltage-to-current converter (VC-C) is the exemplary input of a current controlled voltage regulator advanced by a said component (VREG, RI, R2, VC-C). In contrast to the state of the art, the construction is particularly robust against EMC radiation and potential offset due to the current-controlled signal.

LIST OF ABBREVIATIONS (NOT IN THE FIGURES)

IC3 third integrated circuit
IC4 fourth integrated circuit
ICn n-th integrated circuit
$I_s$ total current of the fed-in bias currents ($I_{bias}$) of all integrated circuits (IC1 to ICn) connected with the standard bus (RB)
K3 third node within the third integrated circuit (IC3)
　The potential difference between the third node and the reference potential (GND) represents the reference voltage for the third transistor (T3) of the third integrated circuit (IC3), which sets the current through the third transistor (T3) of the third integrated circuit (IC3).
K4 fourth node within the fourth integrated circuit (IC4)
　The potential difference between the fourth node and the reference potential (GND) represents the reference voltage for the fourth transistor (T4) of the fourth integrated circuit (IC4), which sets the current through the fourth transistor (T4) of the fourth integrated circuit (IC4).
Kn n-th node within the n-th integrated circuit (ICn)
　The potential difference between the n-th node and the reference potential (GND) represents the reference voltage for the n-th transistor (Tn) of the n-th integrated circuit (ICn), which sets the current through the n-th transistor (Tn) of the n-th integrated circuit (ICn).
$LED_3$ third group of LEDs whose current is regulated by the third integrated circuit (IC3)
$LED_4$ fourth LED group whose current is regulated by the fourth integrated circuit (IC4)
$LED_n$-th LED=n-th LED group whose the current is regulated by the n-th integrated circuit (ICn)
OP3 third differential amplifier of the third integrated circuit (IC3)
OP4 fourth differential amplifier of the fourth integrated circuit (IC4)
OPn n-th differential amplifier of the n-th integrated circuit (ICn)
T3 third transistor of the third integrated circuit (IC3)
T4 fourth transistor of the fourth integrated circuit (IC4)
Tn n-th transistor of the n-th integrated circuit (ICn)

LIST OF ELEMENT REFERENCES

ADC analog-to-digital converter, also known as measuring equipment
ADJ Control input of the voltage regulator (VREG) for the voltage control signal (VCTR)
Cf filter capacity
F filter
GND reference potential
$I_{ADJ}$ additional current
$I_{Bias}$ Constant current of the respective bias current source (IQ), which is supplied via the control bus connection (IQ) of the respective integrated circuit (IC1, IC2) is fed into the control bus (RB). The bias current is preferably a current that is constant over time for setting the operating point of the proposed device.
IC1 first integrated circuit
IC2 second integrated circuit
IQ constant current source of an integrated circuit of the integrated circuits (IC1, IC2 to ICn)
$I_{LED1a}$ Current through the first LED ($LED_{1a}$) of the first LED group ($LED_1$)
$I_{LED1b}$ Current through the second LED ($LED_{1b}$) of the first LED group ($LED_1$)
$I_{LED2}$ Current through the first LED ($LED_{2a}$) and the second LED ($LED_{2b}$) of the second LED group ($LED_2$)
K1 first node within the first integrated circuit (IC1)
　The potential difference between the first node (K1) and the reference potential (GND) represents the reference voltage for the first transistor (T1) of the first integrated circuit (IC1), which sets the current through the first transistor (T1) of the first integrated circuit (IC1).
K2 second node within the second integrated circuit (IC2)
　The potential difference between the second node (K2) and the reference potential (GND) represents the reference voltage for the second transistor (T2) of the second integrated circuit (IC2), which sets the current through the second transistor (T2) of the second integrated circuit (IC2).
$LED_1$ first group of LEDs whose current is regulated by the first integrated circuit (IC1)
$LED_{1a}$ first LED of the first LED group ($LED_1$)
$LED_{1b}$ second LED of the first LED group ($LED_1$)
$LED_2$ second group of LEDs whose current is regulated by the second integrated circuit (IC2)
$LED_{2a}$ first LED of the second LED group ($LED_2$)
$LED_{2B}$ second LED of the second LED group ($LED_2$)
LED0 first LED connection of an integrated circuit
LED1 second LED connection of an integrated circuit
LED DRV LED integrated circuit driver of the integrated circuits (IC1, IC2 to ICn)
OP0 zeroth differential amplifier
OP1 first differential amplifier of the first integrated circuit (IC1)
OP2 second differential amplifier of the second integrated circuit (IC2)
R1 first resistance
R2 second resistance
R3 third resistor
R4 fourth resistor
RA controller of the respective integrated circuit
RB control bus
Ri internal control signal of the respective integrated circuit
Rf resistance of filter (F)
SW1 switch of the first integrated circuit (IC1)
SW2 switch of the second integrated circuit (IC2)
T0 zeroth transistor
T1 first transistor of the first integrated circuit (IC1)
T2 second transistor of the second integrated circuit (IC2)
$V_O$ Output voltage of the voltage regulator (VREG) at his voltage regulator output ($V_{out}$) against the reference potential (GND)
$V_{ADJ}$ Voltage value of the voltage control signal (VCTR) against a reference potential (GND)
VC-C voltage-to-current converter (external voltage to current converter), which is preferably not part of the integrated circuits (IC1, IC2) and/or the voltage regulator (VREG) and which can consist, for example, of a zeroth transistor (TO), an amplifier (OP0) and a third resistor (R3).
VCTR voltage control signal
VIN voltage input of the voltage regulator (VREG)
$V_{out}$ voltage regulator output of the voltage regulator (VREG)
$V_R$ Control voltage at the fourth resistor (R4)
$V_{RB}$ control bus voltage
VREG voltage regulator
VS Supply voltage connection of the voltage regulator (VREG)

LIST OF REFERENCED CITED

DE 10318780 A1
DE 102005028403 B4
DE 102006055312 A1
EP 1499165 B1
EP 2600695 B1
U.S. Pat. No. 7,157,866 B2
U.S. Pat. No. 8,319,449 B2
U.S. Pat. No. 8,519,632 B2
US 2007/0139317 A1
US 2008/0122383 A1
US 2009/0230874 A1
US 2010/0026209 A1
US 2010/0201278 A1
US 2011/0012521 A1
US 2011/0043114 A1
US 2012/0268012 A1
WO 2013/030047 A1

What is claimed is:

1. A method for regulating an output voltage at an output of a voltage regulator for supplying a lighting device with electrical energy, wherein the lighting device comprises at least two integrated circuits, each of the at least two integrated circuits comprising at least one LED group, wherein the lighting device is supplied with the electrical energy by a respective current source belonging to each of the at least one LED groups in each of the at least two integrated circuits, the method comprising:
generating the output voltage by the voltage regulator at the output of the voltage regulator;
setting a LED group current through each of the at least one LED groups in each of the at least two integrated circuits by the respective current source;
detecting respective voltage drop values across each of the respective current sources of each of the at least one LED groups of each of the at least two integrated circuits as the respective voltage drop value of the respective current sources within the respective integrated circuit;
selecting a voltage drop value of one of the respective current sources of the at least one LED groups of each of the at least two integrated circuit from the voltage drop values of the current sources of the respective integrated circuit as a characteristic voltage drop value of the respective integrated circuit and generating a control value signal at a node of the respective integrated circuit corresponding to the characteristic voltage drop value of the respective integrated circuit;
reducing an amount of a control voltage by the respective integrated circuit when the amount of the control voltage is greater than an amount of the control value signal at the node of the respective integrated circuit; and
regulating the output voltage of the voltage regulator at the output of the voltage regulator as a function of the control voltage or a control bus voltage derived from the control voltage.

2. Device for supplying at least two LED groups with electrical energy comprising:
a voltage regulator,
at least two integrated circuits, and
a control bus,
wherein
each of the at least two integrated circuits has at least one LED connection for at least one LED group of the at least two LED groups, and
each of the at least two integrated circuits has at least one LED driver per LED group of the at least one LED group for the energy supply of the LED group via the LED connection associated with the at least one of the LED groups, and
each of the at least two integrated circuits has at least one measuring device for detecting voltage drops respectively between each of the at least one LED connections of the respective integrated circuit and a reference potential (GND), and
each of the at least two integrated circuits comprises a local controller (RA), wherein
the local controller selects a voltage drop value as a characteristic voltage drop value of the respective integrated circuit out of the respective voltage drop values of the at least one LED driver of the respective integrated circuit detected by the measuring device of the respective integrated circuit, and wherein the local controller generates a control value signal at a signal node of the respective integrated circuit according to the selected characteristic voltage drop value of the respective integrated circuit, and wherein
the local controller reduces an amount of a control voltage by the respective integrated circuit when the amount of the control voltage is greater than an amount of the control value signal of the respective integrated circuit at the signal node of the respective integrated circuit, and
an output voltage of the voltage regulator depends on the control voltage or a control bus voltage derived thereof.

* * * * *